Patented Aug. 31, 1948

2,448,405

UNITED STATES PATENT OFFICE 2,448,405

XANTHONE-DDT INSECTICIDE

James F. Adams, Wilmington, Del., assignor to Allied Chemical & Dye Corporation, a corporation of New York No Drawing. Application June 23, 1945,
Serial No. 601,319

8 Claims. (Cl. 167—30)

This invention relates to a new insecticide for application to pome, stone and nut fruit trees for control of insects such as the codling moth larvae, oriental peach moth larvae and mites such as European red mite, which infest such trees.

In accordance with this invention control of insects infesting pome, stone and nut fruit trees is effected by applying to the trees a mixture containing 2,2-bis (parachlorophenyl)-1,1,1-trichloroethane and xanthone. I have found that mixtures of xanthone and 2,2-bis (parachlorophenyl)-1,1,1-trichloroethane are highly toxic to insects such as codling moth larvae and that the percent kill obtained upon the use of these mixtures is greater than that which is obtained by the use of individual ingredients of the mixture, the increase in toxicity possibly being attributable to synergistic action between the individual ingredients of the mixture. I have further found that the mixture employed in accordance with my invention possesses the distinct advantage that it not only achieves a highly effective control of insects such as codling moth larvae which infest pome, stone and nut fruit trees, but also prevents damage to the trees due to the presence of mites such as the European red mite, two spotted mite, Pacific mite, red spider and Bryobia mite; this latter advantage is of importance since the mite population tends to increase markedly when 2,2-bis (parachlorophenyl)-1,1,1-trichloroethane alone is employed for control of insects such as the codling moth larvae which infest pome, stone and nut fruit trees. Accordingly it will be evident that the mixture of my invention possesses important advantages for control of insects infesting pome, stone and nut fruit trees.

The compound 2,2-bis (parachlorophenyl-1,1,1-trichloroethane is known throughout the art as DDT and hereinafter it will be referred to as such.

The products of my invention may be formed by admixing DDT with xanthone in proportions such that the resulting mixture contains between about 10 and about 100 parts of DDT for every 100 parts of xanthone. The mixture may then be applied to the trees in any suitable manner. Thus the DDT-xanthone mixture may be combined with a dust carrier, such as an inert powdered clay, and the dust applied to the trees. Preferably, however, the DDT-xanthone mixture is dispersed in an aqueous medium so as to form a dispersion containing between about ½ and about 2 lbs. of xanthone and between about ¼ and about 1 lb. of DDT per 100 gallons of dispersion and the dispersion then sprayed upon the trees; such dispersions may contain conventional spray supplements such as sticking, spreading, wetting and flocculating agents.

The following field tests conducted in a commercial apple orchard illustrate the effectiveness of my compositions in comparison with DDT and xanthone alone. The portion of the orchard selected for testing was divided into three blocks, the trees in each block bearing apples of the Delicious variety. The trees of each block were given a standard schedule of pre-blossom sprays followed by four standard cover sprays of lead arsenate. Starting with the fifth cover spray the trees were sprayed with the compositions described below, a total of six applications of 20 gallons per application per tree being made before harvest; the composition of the sprays is given in terms of the amount of active ingredient per 100 gallons of spray; in the last three sprays for each block a quart of "summer oil" (a highly saturated hydrocarbon oil) was included to prevent defoliation. The results of the tests are expressed in terms of the number of stings or worms per 100 apples picked and dropped; a "stung" apple is one bearing one or more of the shallow injuries made by a codling moth larva killed while eating into the apple; a "wormy" apple is one bearing one or more of the deep injuries made by a codling moth larva which successfully eats into the flesh of the apple; a "clean" apple is one bearing no injury.

Summary of tests

| Block | Composition of Spray | Percent Drops and Picks | | | Mite Prevalence |
|---|---|---|---|---|---|
| | | Stings | Worms | Clean | |
| A | 1½ lbs. Xanthone | 20.2 | 5.6 | 82 | Trace. |
| B | ½ lb. DDT | 23.7 | 3.9 | 79.5 | Heavy. |
| C | 1 lb. Xanthone, ½ lb. DDT. | 11.8 | 2.6 | 89 | Trace. |

In block B the heavy mite prevalence was of the order of 200 to 300 mites per leaf, sufficient to cause conspicuous bronzing of the foliage.

From the above tests it will be seen that the mixture of xanthone and DDT gives more effective control of codling moth larvae than xanthone or DDT alone, the percent clean applies being 7% greater than obtained when using xanthone alone and 9.5% greater than when using DDT alone.

Since certain changes may be made in the compositions of my invention without departing from the scope thereof, it is intended that all matter contained in the above description shall be interpreted as illustrative and not in a limiting sense.

I claim:

1. An insecticidal composition, the essential active ingredients of which are 2,2-bis(parachlorophenyl)-1,1,1-trichloroethane and xanthone.

2. An insecticidal composition, the essential active ingredients of which are 2,2-bis(parachlorophenyl)-1,1,1-trichloroethane and xanthone, the composition containing between about 10 and about 100 parts by weight of 2,2-bis(parachlorophenyl)-1,1,1-trichloroethane per 100 parts by weight of xanthone.

3. An insecticidal composition comprising an aqueous dispersion, the essential active ingredients of which are 2,2-bis(parachlorophenyl)-1,1,1-trichloroethane and xanthone.

4. An insecticidal composition comprising an aqueous dispersion containing, as its essential active ingredients, between about ¼ and about 1 lb. of 2,2-bis(parachlorophenyl)-1,1,1-trichloroethane and between about ½ and about 2 lbs. of xanthone per 100 gallons of dispersion.

5. A method for controlling insects infesting pome, stone and nut fruit trees, which comprises subjecting the insects to the action of a mixture containing as its essential active ingredients 2,2-bis(parachlorophenyl)-1,1,1-trichloroethane and xanthone.

6. A method for controlling insects infesting pome, stone and nut fruit trees, which comprises subjecting the insects to the action of a mixture containing as its essential active ingredients between about 10 and about 100 parts by weight of 2,2-bis(parachlorophenyl)-1,1,1-trichloroethane per 100 parts by weight of xanthone.

7. A method for controlling codling moth larvae and mites on pome, stone and nut fruit trees, which comprises spraying the tree with an aqueous dispersion containing as its essential active ingredients 2,2-bis(parachlorophenyl)-1,1,1-trichloroethane and xanthone.

8. A method for controlling codling moth larvae and mites on pome, stone and nut fruit trees, which comprises spraying the tree with an aqueous dispersion containing as its essential active ingredients between about ¼ and about 1 lb. of 2,2-bis(parachlorophenyl)-1,1,1-trichloroethane and between about ½ and about 2 lbs. of xanthone per 100 gallons of dispersion.

JAMES F. ADAMS.

REFERENCES CITED

The following references are of record in the file of this patent:

UNITED STATES PATENTS

| Number | Name | Date |
|---|---|---|
| Re. 22,700 | Muller | Dec. 4, 1945 |
| 2,347,377 | Swaine | Apr. 25, 1944 |

OTHER REFERENCES

Campbell et al., Manufacturing Chemist and Manufacturing Perfumer, Sept. 1944, vol. XV, No. 9, pages 312, 315, 316.

Ingram, J. Economic Entomology, February 1944, vol. 37, No. 1, pages 144, 145.